US012770357B2

(12) United States Patent
Wu et al.

(10) Patent No.: US 12,770,357 B2
(45) Date of Patent: Oct. 20, 2026

(54) IMAGE PROCESSING METHOD AND IMAGE PROCESSING APPARATUS FOR RECOGNIZING TARGET OBJECT

(71) Applicants: The Boeing Company, Arlington, VA (US); Tsinghua University, Beijing (CN)

(72) Inventors: Yong Wu, Beijing (CN); Jinxin Qian, Beijing (CN); Yijia Wang, Beijing (CN); Zongqing Lu, Beijing (CN); Qingmin Liao, Beijing (CN); Weimin Luo, Beijing (CN)

(73) Assignees: The Boeing Company, Arlington, VA (US); Tsinghua University, Beijing (CN)

( * ) Notice: Subject to any disclaimer, the term of this patent is extended or adjusted under 35 U.S.C. 154(b) by 260 days.

(21) Appl. No.: 18/772,662

(22) Filed: Jul. 15, 2024

(65) Prior Publication Data

US 2025/0086928 A1 Mar. 13, 2025

(30) Foreign Application Priority Data

Sep. 13, 2023 (CN) .......................... 202311181174.8

(51) Int. Cl.
*G06V 10/44* (2022.01)
*G06V 10/28* (2022.01)

(52) U.S. Cl.
CPC ............ *G06V 10/457* (2022.01); *G06V 10/28* (2022.01)

(58) Field of Classification Search
USPC ........................................................ 382/190
See application file for complete search history.

(56) References Cited

U.S. PATENT DOCUMENTS 4,630,219 A * 12/1986 DiGiacomo .......... G06F 30/392 716/135
5,179,599 A * 1/1993 Formanek ............ G06V 30/162 382/172

(Continued)

OTHER PUBLICATIONS

He et al. (Lifeng He, Xiwei Ren, Qihang Gao, Xiao Zhao, Bin Yao, Yuyan Chao, "The connected-component labeling problem: A review of state-of-the-art algorithms", Pattern Recognition, vol. 70,2017, pp. 25-43, ISSN 0031-3203, https://doi.org/10.1016/j.patcog.2017.04.018.) (Year: 2017).*

(Continued)

*Primary Examiner* — Chineyere Wills-Burns
*Assistant Examiner* — Aaron Timothy Bonansinga
(74) *Attorney, Agent, or Firm* — Walters & Wasylyna LLC

(57) ABSTRACT

The present application discloses an image processing method and image processing apparatus for recognizing a target object. The image processing method comprises: acquiring an original image comprising a target object; performing binarization processing on the original image, to obtain a binarized image; performing, by a multi-core processor, one-dimensional scanning in a parallel manner on each pixel row of the binarized image, to extract one-dimensional connected regions of each pixel row of the binarized image; combining adjacent pixel rows to generate a first maximum connected region including a plurality of one-dimensional connected regions; and with regard to respective pixel rows of the first maximum connected region, aligning heads of initial one-dimensional connected regions of the respective pixel rows, and aligning tails of final one-dimensional connected regions of the respective pixel rows, so as to generate a second maximum connected region; performing two-dimensional scanning on the aligned (Continued)

heads and the aligned tails of the second maximum connected region, to recognize the target object.

20 Claims, 4 Drawing Sheets

(56) References Cited

U.S. PATENT DOCUMENTS

| | | | | |
|---|---|---|---|---|
| 6,763,137 | B1 * | 7/2004 | Krtolica | G06V 10/426 382/245 |
| 8,300,945 | B2 * | 10/2012 | Campbell | G06V 10/426 382/175 |
| 2005/0002652 | A1 * | 1/2005 | Hartung | H04N 19/895 360/32 |
| 2007/0116357 | A1 * | 5/2007 | Dewaele | G06T 7/12 382/128 |
| 2007/0248266 | A1 * | 10/2007 | Matsuno | G06V 10/955 382/180 |
| 2009/0087058 | A1 * | 4/2009 | Ihara | G06V 10/457 382/131 |
| 2010/0158376 | A1 * | 6/2010 | Klosterman | G06V 10/457 382/180 |
| 2010/0310170 | A1 * | 12/2010 | Li | G06T 7/13 382/173 |
| 2011/0142303 | A1 * | 6/2011 | Mathew | G06T 7/11 382/128 |
| 2011/0158534 | A1 * | 6/2011 | Fahn | G06T 7/187 382/180 |
| 2013/0194448 | A1 * | 8/2013 | Baheti | G06V 30/18095 348/222.1 |
| 2015/0030250 | A1 * | 1/2015 | Poyil | G06T 7/12 382/195 |
| 2015/0117769 | A1 * | 4/2015 | Mayer | G06V 10/457 382/164 |
| 2020/0387354 | A1 * | 12/2020 | Cao | G06F 16/583 |
| 2021/0235098 | A1 * | 7/2021 | Xu | H04N 19/176 |

OTHER PUBLICATIONS

Lemaitre et al. (Florian Lemaitre and Lionel Lacassagne, “A New Run-Based Connected Component Labeling for Efficiently Analyzing and Processing Holes”, arXiv:2006.09299v1 [cs.CV] Jun. 16, 2020) (Year: 2020).*

* cited by examiner (a) (b)

IMAGE PROCESSING METHOD AND IMAGE PROCESSING APPARATUS FOR RECOGNIZING TARGET OBJECT

PRIORITY

This application claims priority from Chinese Patent Application Number 2023111811748 filed on Sep. 13, 2023, the entire contents of which are incorporated herein by reference.

FIELD

The present application generally relates to the technical field of image processing, and more particularly, to an image processing method and image processing apparatus for recognizing a target object.

BACKGROUND

Blob analysis has been widely used in real-time industrial vision systems, and has been mainly widely used for real-time image processing tasks, such as, target detection, object recognition, image measurement, image statistics, and many other applications.

In addition, a greedy scanning method is a common tool for Blob analysis, but it is expensive in terms of calculation, and even more, it has become a bottleneck for real-time applications.

SUMMARY

Disclosed are image processing methods for recognizing a target object.

In one example, the disclosed image processing method for recognizing a target object includes Step S1: acquiring an original image comprising a target object; Step S2: performing binarization processing on the original image, to obtain a binarized image; Step S3: performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail; Step S4: combining adjacent pixel rows subjected to the one-dimensional scanning to generate a first maximum connected region including a plurality of one-dimensional connected regions, wherein the one-dimensional connected regions of the combined adjacent pixel rows are in communication with each other; Step S5: with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side; and Step S6: performing two-dimensional scanning on the aligned heads and the aligned tails of the second maximum connected region, to recognize the target object.

Also disclosed are image processing apparatus for recognizing a target object.

In one example, the disclosed image processing apparatus for recognizing a target object includes a processor and a memory, wherein the memory stores program instructions, and the processor is configured to execute the program instructions to execute: acquiring an original image comprising a target object; performing binarization processing on the original image, to obtain a binarized image; performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail; combining adjacent pixel rows subjected to the one-dimensional scanning to generate a first maximum connected region including a plurality of one-dimensional connected regions, wherein the one-dimensional connected regions of the combined adjacent pixel rows are in communication with each other; and with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side; performing two-dimensional scanning on the aligned heads and the aligned tails of the second maximum connected region, to recognize the target object.

DETAILED DESCRIPTION

Figure 1:
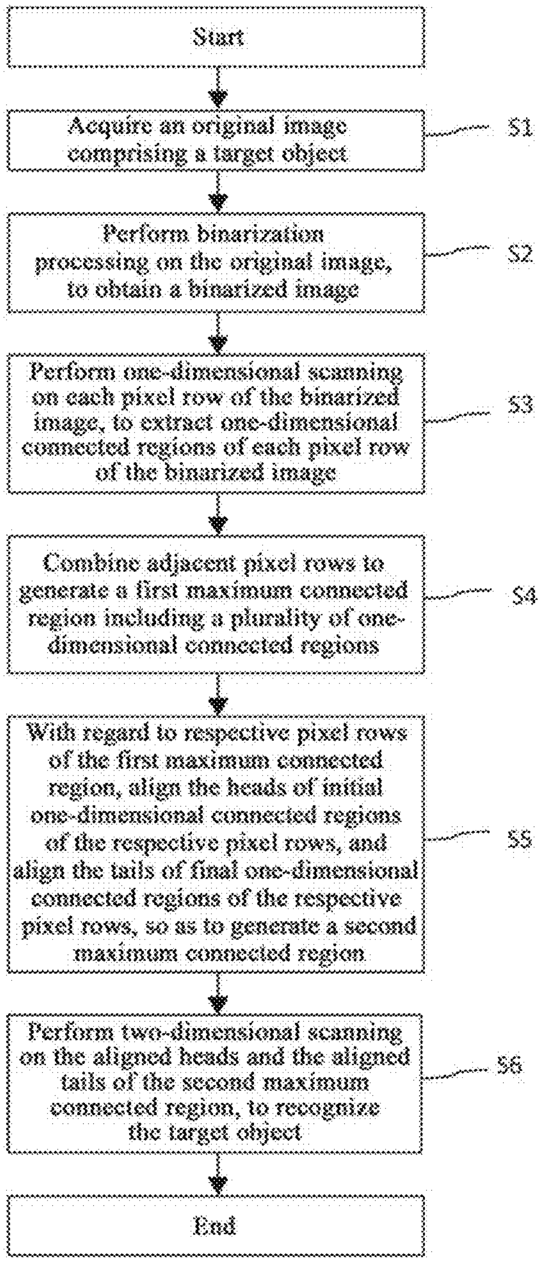
FIG. 1 is a flowchart illustrating an image processing method for recognizing a target object according to embodiments of the present application.

The present application has been made at least in order to mitigate or even eliminate the described technical problems. One aspect of the present application proposes an improved parallel solution of a greedy search method. In the solution, a multi-core microprocessor or a multi-core calculation unit performs parallel scanning on each pixel row of an image by using a greedy method; and a search result of each pixel row is represented again by using a clipping policy and a new image is generated to describe connected regions in a very concise form, the new image facilitating inter-row search by using a classic greedy method. In addition, a conventional tree scanning tool may also be applied to the new image.

According to one aspect of the present application, provided is an image processing method for recognizing a target object, the image processing method comprises: step S1: acquiring an original image comprising a target object; step S2: performing binarization processing on the original image, to obtain a binarized image; step S3: performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail; step S4: combining adjacent pixel rows subjected to the one-dimensional scanning to generate a first maximum connected region including a plurality of one-dimensional connected regions, wherein the one-dimensional connected regions of the combined adjacent pixel rows are in communication with each other; and step S5: with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side; step S6: performing two-dimensional scanning on the aligned heads and the aligned tails of the second maximum connected region, to recognize the target object.

In a schematic example according to an aspect of the present application, step S5 comprises: step S50: comparing the distances of the heads of the initial one-dimensional connected regions of respective pixel rows from the one-dimensional scanning start-side, to determine, among the respective pixel rows, the initial one-dimensional connected region of which the head is farthest from the one-dimensional scanning start-side; step S51: comparing the distances of the tails of the final one-dimensional connected regions of the respective pixel rows from the one-dimensional scanning end-side, to determine, among the respective pixel rows, the final one-dimensional connected region of which the tail is farthest from the one-dimensional scanning end-side; step S52: by taking the head of the initial one-dimensional connected region farthest from the one-dimensional scanning start-side as a reference, moving the heads of other initial one-dimensional connected regions of the respective pixel rows to be aligned with the head of the initial one-dimensional connected region farthest from the one-dimensional scanning start-side; and step S53: by taking the tail of the final one-dimensional connected region farthest from the one-dimensional scanning end-side as a reference, moving the tails of other final one-dimensional connected regions of the respective pixel rows to be aligned with the tail of the final one-dimensional connected region farthest from the one-dimensional scanning end-side.

In a schematic example according to an aspect of the present application, step S3 comprises: performing one-dimensional scanning on each pixel row by using a one-dimensional greedy scanning method, to recognize the heads and the tails of the one-dimensional connected regions; and determining the one-dimensional connected regions by using a four-neighborhood method on the basis of the recognized heads and tails of the one-dimensional connected regions.

In a schematic example according to an aspect of the present application, step S4 further comprises: determining one-dimensional coordinates of the head and the tail of each one-dimensional connected region in a pixel row direction, the head and the tail each having one pixel; and calculating, according to the one-dimensional coordinates of the head and the tail of each one-dimensional connected region, the number of pixels of the intermediate region of each one-dimensional connected region as the length of the intermediate region.

In a schematic example according to an aspect of the present application, step S4 comprises: according to the one-dimensional coordinates of the head and the tail and the length of the intermediate region of each one-dimensional connected region, determining whether the one-dimensional connected regions of the adjacent pixel rows have pixels located at the same position in the pixel row direction, to determine whether the one-dimensional connected regions of the adjacent pixel rows are in communication with each other; and combining the adjacent pixel rows in which the one-dimensional connected regions are in communication with each other, to generate the first maximum connected region.

In a schematic example according to an aspect of the present application, step S4 further comprises: summing the length of the head and the tail and the length of the intermediate region of each one-dimensional connected region included in the first maximum connected region, to calculate an area of the first maximum connected region.

In a schematic example according to an aspect of the present application, step S50 comprises: according to the one-dimensional coordinates of the head and the tail of each one-dimensional connected region, determining the heads of the initial one-dimensional connected regions of the respective pixel rows and the tails of the final one-dimensional connected regions of the respective pixel rows.

In a schematic example according to an aspect of the present application, step S6 comprises: performing two-dimensional greedy scanning on the aligned heads and the aligned tails of the second maximum connected region, to output feature parameters of the target object.

In a schematic example according to an aspect of the present application, the feature parameters comprise at least one of: the area of the target object, the center of gravity of the target object, and the perimeter of the target object.

In a schematic example according to an aspect of the present application, the one-dimensional connected regions and the aligned heads and tails in the second maximum connected region form a branching tree structure, wherein the one-dimensional connected regions in the second maximum connected region represent leaf nodes of the branching tree structure, the aligned heads and tails represent edges connecting the leaf nodes, and the two-dimensional scanning is executed by means of a branching tree scanning method.

According to another aspect of the present application, provided is an image processing apparatus for recognizing a target object, the image processing apparatus comprising a processor and a memory, wherein the memory stores program instructions to execute the described image processing method.

According to another aspect of the present application, further provided is a computer-readable storage medium which stores a program, wherein the program, when executed by a processor, implements the described image processing method.

In the present application, a multi-core microprocessor or a multi-core calculation unit performs parallel scanning on each pixel row of an image by using a greedy method; and a search result of each pixel row is represented again by using a clipping policy and a new image is generated to describe connected regions in a very concise form, which can greatly increase the scanning efficiency and can facilitate inter-row search by using a classic greedy method. In addition, a conventional tree scanning tool may also be applied to the new image.

Hereinafter, in order to make a person skilled in the art better understand the present disclosure, the embodiments of the present disclosure will be described clearly and completely in combination with the accompanying drawings in the present disclosure. Obviously, the embodiments as described are only some embodiments rather than all embodiments of the present disclosure. On the basis of the embodiments in the present disclosure, all other embodiments obtained by a person skilled in the art without involving any inventive effort shall all fall within the scope of protection of the present disclosure.

In order to solve the problems that most existing Blob analysis methods are low-efficient modules in applications, and it is difficult to perform pixel inter-row search by using a mature greedy scanning method in the related art, the present disclosure provides an image processing method for recognizing a target object. FIG. 1 is a flowchart illustrating an image processing method for recognizing a target object according to one embodiment of the present disclosure.

In step S1: acquiring an original image comprising a target object.

In this step, an image comprising a target object may be photographed by a camera as the original image, or the image comprising the target object may also be acquired from an image library pre-stored in a memory. The target object may be any object of interest, e.g., a person, an aircraft, an obstacle, etc.

In step S2: performing binarization processing on the original image acquired in step S1, to obtain a binarized image.

In this step, by performing binarization processing on the original image, image segmentation is performed. Namely, the binarization is to simplify and change the representation form of the image, so that the image can be more easily understood and analyzed; and the image segmentation is to subdivide the original image into a plurality of image sub-regions, and thus the object of interest in the image, and feature parameters, such as the boundary and area of the object of interest, can be easily located. The binarization of the image refers to setting the grayscale values of pixel points on the image to be 0 or 255, as shown in (a) of FIG. 5.

In step S3: performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail.

Figure 3:
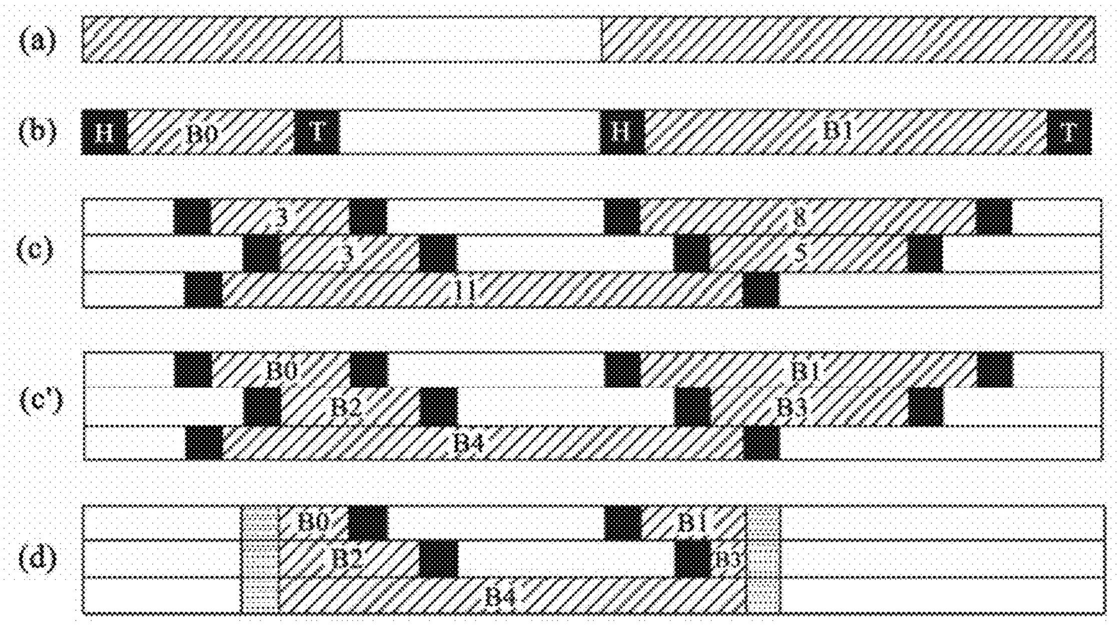
FIG. 3 is an exploded schematic diagram of an execution process of an image processing method for recognizing a target object according to embodiments of the present application.
Figure 5:
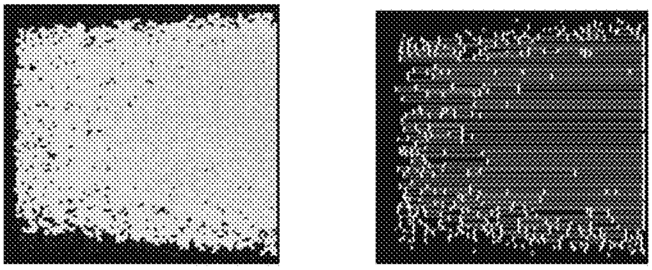
FIG. 5 relates to photographs of an image for being processed by an image processing method for recognizing a target object according to embodiments of the present application.

As shown in (a) of FIG. 3 of the present application, a multi-core processor may perform one-dimensional scanning in a parallel manner on each pixel row of the binarized image as shown in (a) of FIG. 5 by using a one-dimensional greedy scanning method, to extract one-dimensional connected regions of each pixel row of the binarized image, such as one-dimensional connected regions B0 and B1 shown in (a) of FIG. 3, and a head H and a tail T of each one-dimensional connected region are recognized. On the basis of the head H and the tail T of each of the recognized one-dimensional connected region, the one-dimensional connected regions B0 and B1 can be determined by recognizing a contact region (corresponding to a pixel) on the right side of the head H and a contact region on the left side of the tail T by using a four-neighborhood method. The four-neighborhood method is known in the field of machine vision, and will not be repeated herein. In the four-neighborhood method, whether two pixels are contact regions is determined according to the adjacency of the pixels, wherein the adjacency of the pixels refers to an adjacency property between a current pixel and a peripheral pixel, and is generally referred to as a neighborhood of the pixel, and the adjacency property indicates adjacency relationships between the pixels: 1) whether the positions of the two pixels are adjacent; and 2) whether color values or grayscale values of the two pixels meet a specific similarity criterion (the two are similar).

Then, as shown in (b) of FIG. 3, the head H and the tail T of each of the one-dimensional connected regions B0 and B1 can be labeled on the basis of coordinates in a pixel row direction during scanning, wherein each of the head H and the tail T has one pixel, and thus the number of pixels included in the intermediate region between the head H and the tail T may be further calculated on the basis of the coordinates of the head H and the tail T and is taken as the length of the intermediate region.

Step S4: combining adjacent pixel rows subjected to the one-dimensional scanning to generate a first maximum connected region including a plurality of one-dimensional connected regions, wherein the one-dimensional connected regions of the combined adjacent pixel rows are in communication with each other.

As shown in (c) of FIG. 3 of the present application, in this illustrative example, the one-dimensional connected regions of three adjacent pixel rows are in communication with each other, and therefore the three adjacent pixel rows are combined, so that a plurality of (in this example, five in total) one-dimensional connected regions contained in the three adjacent pixel rows are in communication with each other and constitute a first maximum connected region. In the first maximum connected region, a total area of the intermediate regions is 3+3+8+5+11=30 pixels.

In this step, according to the one-dimensional coordinates of the head H and the tail T and the length of the intermediate region B of each one-dimensional connected region determined in the steps above, whether the one-dimensional connected regions of the adjacent pixel rows have pixels located at the same position in the pixel row direction can be determined, so as to determine whether the one-dimensional connected regions of the adjacent pixel rows are in communication with each other. For example, as shown in (c) and (c') of FIG. 3, two one-dimensional connected regions B2 and B3 of the second pixel row are respectively in communication with two one-dimensional connected regions B2 and B1 of the first pixel row, and one one-dimensional connected region B4 of the third pixel row is in communication with both two one-dimensional connected regions B2 and B3 of the second pixel row. Then, the three pixel rows in which these one-dimensional connected regions are in communication with each other are combined, thereby generating the first maximum connected region.

However, in order to obtain feature parameters of the first maximum connected region of the image as shown in (c) of FIG. 3, five linear one-dimensional connected regions B0, B1, B2, B3, B4, and B5 need to be scanned, but scanning each one-dimensional connected region to describe such a two-dimensional connected region is inconvenient and low-efficient. On this basis, the present application contemplates a shrinking solution to generate a new image, as detailed in step S5 described below.

In step S5: with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side.

In this step, for the two-dimensional image as shown in (c') of FIG. 3, in the two-dimensional first maximum connected region, the one-dimensional connected regions B0, B1, B2, B3, and B4 should be considered as a part of the entire 2D maximum connected region.

Figure 2:
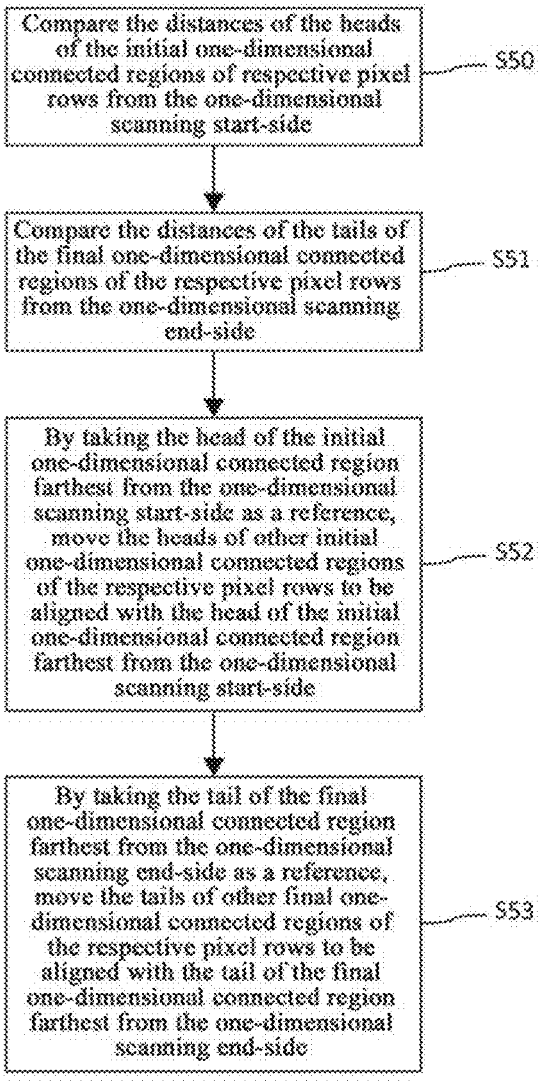
FIG. 2 is a flowchart illustrating an execution process of step S5 in the image processing method of FIG. 1.

Then, a shrinking solution is used for the two-dimensional image as shown in (c') of FIG. 3. The shrinking solution is as shown in FIG. 2, and the shrinking solution comprises: by using labelled one-dimensional coordinates of the head H and the tail T of each one-dimensional connected region recorded in the described one-dimensional scanning process, determining the heads of the initial one-dimensional connected regions of the respective pixel rows and the tails of final one-dimensional connected regions of the respective pixel rows. As shown in (c') of FIG. 3, the initial one-dimensional connected region of the first pixel row is B0, the initial one-dimensional connected region of the second pixel row is B2, and the initial one-dimensional connected region of the third pixel row is B4; and the final one-dimensional connected region of the first pixel row is B1, the final one-dimensional connected region of the second pixel row is B3, and the final one-dimensional connected region of the third pixel row is B4. Then, in step S50, comparing the distances between the heads of the initial one-dimensional connected regions B0, B2 and B4 of respective pixel rows and the one-dimensional scanning start-side (the leftmost side), to determine, among the pixel rows, the initial one-dimensional connected region of which the head is farthest from the one-dimensional scanning start-side (in this example, the one-dimensional connected region B2); step S51: comparing the distances between the tails of the final one-dimensional connected regions B1, B3 and B4 of respective pixel rows and the one-dimensional scanning end-side, to determine, among the respective pixel rows, the final one-dimensional connected region of which the tail is farthest from the one-dimensional scanning end-side (the rightmost side) (in the present example, the one-dimensional connected region B4); step S52: by taking the head of the initial one-dimensional connected region B2 farthest from the one-dimensional scanning start-side as a reference, moving the heads of other initial one-dimensional connected regions B0 and B4 of the respective pixel rows to be aligned with the head of the initial one-dimensional connected region B2 farthest from the one-dimensional scanning start-side; and step S53: by taking the tail of the final one-dimensional connected region B4 farthest from the one-dimensional scanning end-side as a reference, moving the tails of other final one-dimensional connected regions B1 and B3 of the respective pixel rows to be aligned with the tail of the final one-dimensional connected region B4 farthest from the one-dimensional scanning end-side.

Thus, in step S5, only the head of a starting-end (leftmost) one-dimensional connected region and the tail of the final (rightmost) one-dimensional connected region of each pixel row are moved. In this example, with the head of the one-dimensional connected region B2 as a reference, the heads of the one-dimensional connected regions B0 and B4 are moved rightward so as to be aligned with the head of the one-dimensional connected region B2; and with the tail of the one-dimensional connected region B4 as a reference, the tails of the one-dimensional connected regions B1 and B3 are moved leftward so as to be aligned with the tail of the one-dimensional connected region B4. Therefore, the proposed shrinking solution can ensure that the heads of various one-dimensional connected regions are connected to each other and the tails of various one-dimensional connected regions are connected to each other, while the main structure (frame) of the two-dimensional connected region does not change. (b) of FIG. 5 shows real connected regions and aligned heads and tails of the image subjected to the described processing.

Step S6: performing two-dimensional scanning on the aligned heads and the aligned tails of the second maximum connected region, to recognize the target object.

In this step, two-dimensional greedy scanning can be performed on the aligned heads and the aligned tails of the second maximum connected region, to output feature parameters of the target object. The feature parameters may comprise at least one of: the area of the target object, the center of gravity of the target object, and the perimeter of the target object.

Figure 4:
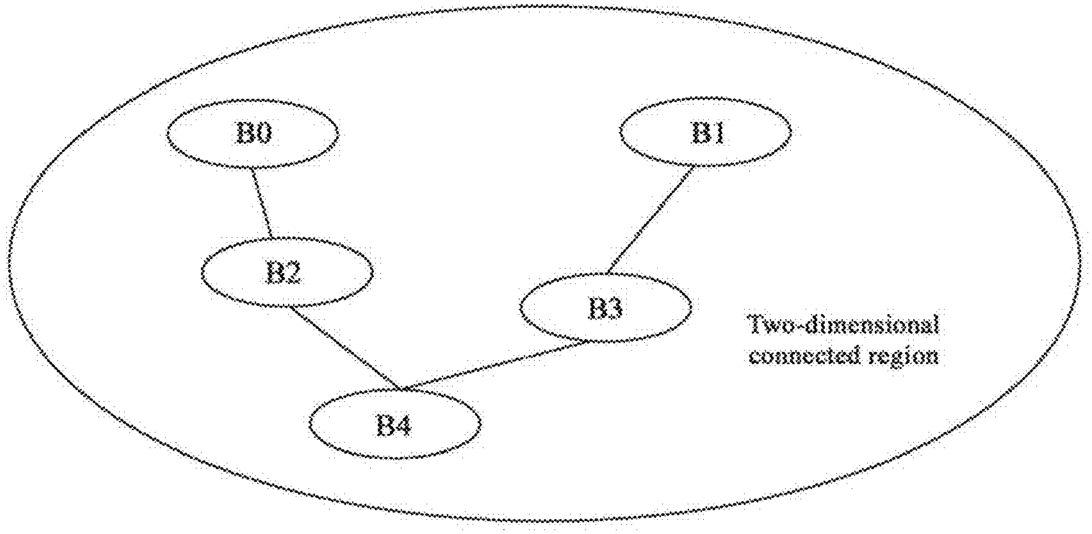
FIG. 4 is an illustration of a new data structure generated by an image processing method for recognizing a target object according to embodiments of the present application.

Further, by the described image processing process, the connection relationships of the one-dimensional connected regions can be obtained only by a small amount of calculation, to form a complete two-dimensional connected region, and the complete two-dimensional connected region may form a branching tree structure as shown in FIG. 4; wherein the one-dimensional connected regions B0, B1, B2, B3, and B4 in the second maximum connected region represent leaf nodes of the branching tree structure, and the aligned heads and tails represent edges connecting the leaf nodes. Thus, in step S6, two-dimensional scanning of the nodes and edges can be performed by a branching tree scanning method, to recognize the target object and obtain the feature parameters of the target object.

Therefore, in the present disclosure, after the shrinking process is completed, the heads and the tails will form straight and connected strips, as shown in (d) of FIG. 4. Boxes with dots are pixels actually participating in the scanning, and a large number of the remaining pixels (such as those pixels inside the intermediate regions of the one-dimensional connected regions) will not need to be scanned, which will greatly increase the scanning efficiency and reduce the processing overhead.

In the present application, a multi-core microprocessor or a multi-core calculation unit performs parallel scanning on each pixel row of an image by using a greedy method; and a search result of each pixel row is represented again by using a clipping policy and a new image is generated to describe connected regions in a very concise form, which can greatly increase the scanning efficiency and can facilitate inter-row search by using a classic greedy method. In addition, a conventional tree scanning tool may also be applied to the new image.

Figure 6:
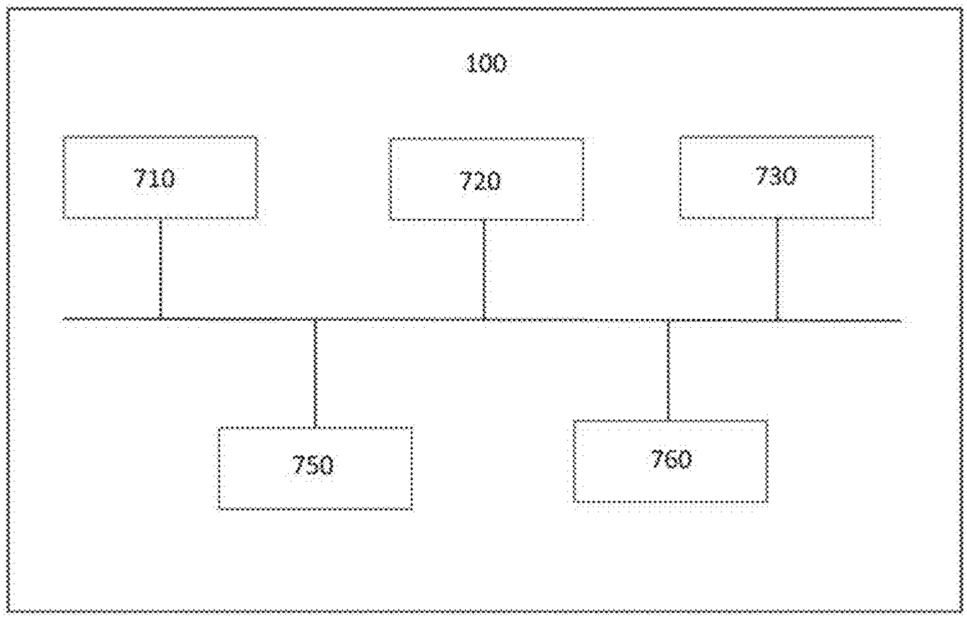
FIG. 6 is a schematic diagram of an example of an image processing apparatus that is a part of a hardware part of an image processing apparatus for recognizing a target object according to embodiments of the present disclosure.

FIG. 6 is a schematic diagram of an example of an image processing apparatus 100 that is a part of a hardware part of an image processing apparatus for recognizing a target object according to embodiments of the present disclosure. As illustrated in FIG. 6, the image processing apparatus 100 may comprise: a CPU 710 for performing overall control, parallel scanning and executing program instructions, a Read Only Memory (ROM) 720 for storing system software, a Random Access Memory (RAM) 730 for storing write/read data, a storage unit 740 for storing various programs and data, an input and output unit 750 serving as an interface for input and output, and a communication unit 760 for implementing a communication function. The CPU 710 may be formed by, for example, a multi-core microprocessor or a multi-core calculation unit. The input and output unit 750 may comprise various interfaces such as an input/output interface (I/O interface), a universal serial bus (USB) port (which may be included as one of ports of the I/O interface), and a network interface. A person of ordinary skill in the art could understand that the structure shown in FIG. 6 is merely exemplary, which does not limit a hardware construction of a main control system. For example, the image processing apparatus 100 may also comprise more or fewer components than those as shown in FIG. 6, or have a different configuration from that shown in FIG. 6.

The storage unit 740 can be used for storing software programs of application software, program instructions and modules for implementing the image processing method of the present application, such as program instructions/data storage apparatus corresponding to a main control instruction image processing method described in the present disclosure; and the CPU 710 implements the described main control instruction image processing method by running the software programs and modules stored in the storage unit 740. The storage unit 740 may comprise a non-volatile memory, such as one or more magnetic storage apparatuses, flash memory, or other non-volatile solid-state memory. In some examples, the storage unit 740 may further comprise memories remotely located from the CPU 710, and these remote memories may be connected to the image processing apparatus 100 over a network. Examples of the network include but are not limited to the Internet, an intranet, a local area network, a mobile communication network and a combination thereof.

The communication unit 760 is used to receive or send data via a network. Specific examples of the network above may comprise a wireless network provided by a communication provider of the image processing apparatus 100. In one example, the communication unit 760 comprises a network adapter (Network Interface Controller, NIC) which may be connected to other network devices by means of a base station, thereby being able to communicate with the Internet. In one example, the communication unit 760 may be a Radio Frequency (RF) module which is used to communicate with the Internet in a wireless manner.

Embodiments of the present disclosure also provide a computer-readable storage medium, on which a computer program is stored, and when the computer program is executed by a processor, the image processing method as described in the embodiments above is implemented.

In an embodiment, the computer-readable storage medium above may be stored in the storage unit 740 in FIG. 6, so as to implement the image processing method for recognizing a target object in conjunction with other components in FIG. 6.

The reference numerals for the method steps are for convenience of explanation only and do not limit the order of the steps. Thus, unless the context clearly dictates otherwise, the steps described above may be performed in other orders, or in parallel.

The description above only relates to preferred embodiments of the present disclosure. It should be noted that for a person of ordinary skill in the art, several improvements and modifications can also be made without departing from the principle of the present disclosure, and these improvements and modifications shall also be considered as within the scope of protection of the present disclosure.

What is claimed is:

1. An image processing method for recognizing a target object, wherein the image processing method comprises:

step S1: acquiring an original image comprising a target object;

step S2: performing binarization processing on the original image, to obtain a binarized image;

step S3: performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail;

step S4: combining adjacent pixel rows subjected to the one-dimensional scanning to generate a first maximum connected region including a plurality of one-dimensional connected regions, wherein the one-dimensional connected regions of the combined adjacent pixel rows are in communication with each other; and step S5: with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side;

step S6: performing two-dimensional scanning on the aligned heads and the aligned tails of the second maximum connected region, to recognize the target object.

2. The image processing method according to claim 1, wherein the step S5 comprises:

step S50: comparing the distances of the heads of the initial one-dimensional connected regions of respective pixel rows from the one-dimensional scanning start-side, to determine, among the respective pixel rows, the initial one-dimensional connected region of which the head is farthest from the one-dimensional scanning start-side;

step S51: comparing the distances of the tails of the final one-dimensional connected regions of the respective pixel rows from the one-dimensional scanning end-side, to determine, among the respective pixel rows, the final one-dimensional connected region of which the tail is farthest from the one-dimensional scanning end-side;

step S52: by taking the head of the initial one-dimensional connected region farthest from the one-dimensional scanning start-side as a reference, moving the heads of other initial one-dimensional connected regions of the respective pixel rows to be aligned with the head of the initial one-dimensional connected region farthest from the one-dimensional scanning start-side; and step S53: by taking the tail of the final one-dimensional connected region farthest from the one-dimensional scanning end-side as a reference, moving the tails of other final one-dimensional connected regions of the respective pixel rows to be aligned with the tail of the final one-dimensional connected region farthest from the one-dimensional scanning end-side.

3. The image processing method according to claim 1, wherein the step S3 comprises:

performing one-dimensional scanning on each pixel row by using a one-dimensional greedy scanning method, to recognize the heads and the tails of the one-dimensional connected regions; and determining the one-dimensional connected regions by using a four-neighborhood method on the basis of the recognized heads and tails of the one-dimensional connected regions.

4. The image processing method according to claim 3, wherein the step S3 further comprises:

determining one-dimensional coordinates of the head and the tail of each one-dimensional connected region in a pixel row direction, wherein the head and the tail each having one pixel; and calculating, according to the one-dimensional coordinates of the head and the tail of each one-dimensional connected region, the number of pixels of the intermediate region of each one-dimensional connected region as the length of the intermediate region.

5. The image processing method according to claim 4, wherein the step S4 comprises:

according to the one-dimensional coordinates of the head and the tail and the length of the intermediate region of each one-dimensional connected region, determining whether the one-dimensional connected regions of the adjacent pixel rows have pixels located at the same position in the pixel row direction, to determine whether the one-dimensional connected regions of the adjacent pixel rows are in communication with each other; and combining the adjacent pixel rows in which the one-dimensional connected regions are in communication with each other, to generate the first maximum connected region.

6. The image processing method according to claim 5, wherein the step S4 further comprises:

summing the length of the head and the tail and the length of the intermediate region of each one-dimensional connected region included in the first maximum connected region, to calculate an area of the first maximum connected region.

7. The image processing method according to claim 4, wherein the step S3 comprises:

according to the one-dimensional coordinates of the head and the tail of each one-dimensional connected region, determining the heads of the initial one-dimensional connected regions of the respective pixel rows and the tails of the final one-dimensional connected regions of the respective pixel rows.

8. The image processing method according to claim 1, wherein the step S6 comprises:

performing two-dimensional greedy scanning on the aligned heads and the aligned tails of the second maximum connected region, to output feature parameters of the target object.

9. The image processing method according to claim 8, wherein the feature parameters at least comprise at least one of: the area of the target object, the center of gravity of the target object, and the perimeter of the target object.

10. The image processing method according to claim 1, wherein the one-dimensional connected regions and the aligned heads and tails in the second maximum connected region form a branching tree structure, wherein the one-dimensional connected regions in the second maximum connected region represent leaf nodes of the branching tree structure, the aligned heads and tails represent edges connecting the leaf nodes, and the two-dimensional scanning is executed by means of a branching tree scanning method.

11. An image processing apparatus for recognizing a target object, the image processing apparatus comprising a processor and a memory, wherein the memory stores program instructions, and the processor is configured to execute the program instructions to execute:

acquiring an original image comprising a target object;

performing binarization processing on the original image, to obtain a binarized image;

performing, by a multi-core processor, one-dimensional scanning in a parallel manner on each pixel row of the binarized image, to extract one-dimensional connected regions of each pixel row of the binarized image, wherein each one-dimensional connected region has a head indicating a start position of the one-dimensional connected region, a tail indicating an end position of the one-dimensional connected region, and an intermediate region located between the head and the tail;

combining adjacent pixel rows subjected to the one-dimensional scanning to generate a first maximum connected region including a plurality of one-dimensional connected regions, wherein the one-dimensional connected regions of the combined adjacent pixel rows are in communication with each other; and with regard to respective pixel rows of the first maximum connected region, aligning the heads of initial one-dimensional connected regions of the respective pixel rows, and aligning the tails of final one-dimensional connected regions of the respective pixel rows, so as to generate a second maximum connected region, wherein the initial one-dimensional connected regions are located at a one-dimensional scanning start-side, and the final one-dimensional connected regions are located at a one-dimensional scanning end-side;

performing two-dimensional scanning on the aligned heads and the aligned tails of the second maximum connected region, to recognize the target object.

12. The image processing apparatus according to claim 11, wherein the processor is further configured to execute the program instructions to execute:

comparing the distances of the heads of the initial one-dimensional connected regions of respective pixel rows from the one-dimensional scanning start-side, to determine, among the respective pixel rows, the initial one-dimensional connected region of which the head is farthest from the one-dimensional scanning start-side;

comparing the distances of the tails of the final one-dimensional connected regions of the respective pixel rows from the one-dimensional scanning end-side, to determine, among the respective pixel rows, the final one-dimensional connected region of which the tail is farthest from the one-dimensional scanning end-side;

by taking the head of the initial one-dimensional connected region farthest from the one-dimensional scanning start-side as a reference, moving the heads of other initial one-dimensional connected regions of the respective pixel rows to be aligned with the head of the initial one-dimensional connected region farthest from the one-dimensional scanning start-side; and by taking the tail of the final one-dimensional connected region farthest from the one-dimensional scanning end-side as a reference, moving the tails of other final one-dimensional connected regions of the respective pixel rows to be aligned with the tail of the final one-dimensional connected region farthest from the one-dimensional scanning end-side.

13. The image processing apparatus according to claim 11, wherein the processor is further configured to execute the program instructions to execute:

performing one-dimensional scanning on each pixel row by using a one-dimensional greedy scanning method, to recognize the heads and the tails of the one-dimensional connected regions; and determining the one-dimensional connected regions by using a four-neighborhood method on the basis of the recognized heads and tails of the one-dimensional connected regions.

14. The image processing apparatus according to claim 13, wherein the processor is further configured to execute the program instructions to execute:

determining one-dimensional coordinates of the head and the tail of each one-dimensional connected region in a pixel row direction, the head and the tail each having one pixel; and calculating, according to the one-dimensional coordinates of the head and the tail of each one-dimensional connected region, the number of pixels of the intermediate region of each one-dimensional connected region as the length of the intermediate region.

15. The image processing apparatus according to claim 14, wherein the processor is further configured to execute the program instructions to execute:

according to the one-dimensional coordinates of the head and the tail and the length of the intermediate region of each one-dimensional connected region, determining whether the one-dimensional connected regions of the adjacent pixel rows have pixels located at the same position in the pixel row direction, to determine whether the one-dimensional connected regions of the adjacent pixel rows are in communication with each other; and combining the adjacent pixel rows in which the one-dimensional connected regions are in communication with each other, to generate the first maximum connected region.

16. The image processing apparatus according to claim 15, wherein the processor is further configured to execute the program instructions to execute:

summing the length of the head and the tail and the length of the intermediate region of each one-dimensional connected region included in the first maximum connected region, to calculate an area of the first maximum connected region.

17. The image processing apparatus according to claim 14, wherein the processor is further configured to execute the program instructions to execute:

according to the one-dimensional coordinates of the head and the tail of each one-dimensional connected region, determining the heads of the initial one-dimensional connected regions of the respective pixel rows and the tails of the final one-dimensional connected regions of the respective pixel rows.

18. The image processing apparatus according to claim 11, wherein the processor is further configured to execute the program instructions to execute:

performing two-dimensional greedy scanning on the aligned heads and the aligned tails of the second maximum connected region, to output feature parameters of the target object.

19. The image processing apparatus according to claim 18, wherein the feature parameters comprise at least one of: the area of the target object, the center of gravity of the target object, and the perimeter of the target object.

20. The image processing apparatus according to claim 11, wherein the one-dimensional connected regions and the aligned heads and tails in the second maximum connected region form a branching tree structure, wherein the one-dimensional connected regions in the second maximum connected region represent leaf nodes of the branching tree structure, the aligned heads and tails represent edges connecting the leaf nodes, and the two-dimensional scanning is executed by means of a branching tree scanning method.

* * * * *